Aug. 29, 1950 G. L. PELLEGRINELLI ET AL 2,520,167
DIRECTION FINDER SYSTEM
Filed July 1, 1946
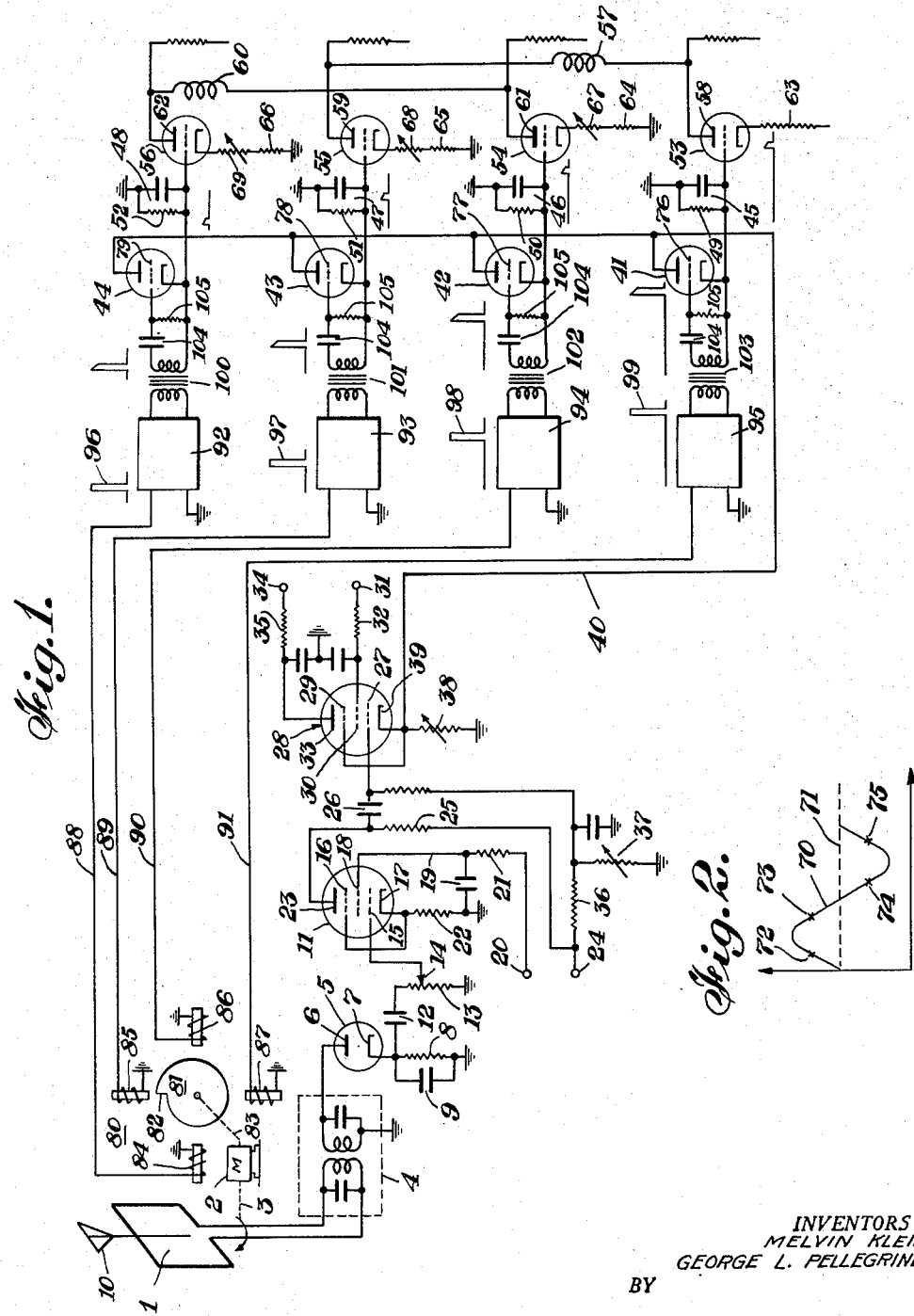
INVENTORS
MELVIN KLEIN
GEORGE L. PELLEGRINELLI
BY
ATTORNEY Patented Aug. 29, 1950

2,520,167

UNITED STATES PATENT OFFICE 2,520,167

DIRECTION FINDER SYSTEM

George L. Pellegrinelli, New York, N. Y., and Melvin Klein, Newark, N. J., assignors to Federal Telecommunication Laboratories, Inc., New York, N. Y., a corporation of Delaware Application July 1, 1946, Serial No. 680,610

4 Claims. (Cl. 343—118)

This invention relates generally to direction finder systems, and particularly pertains to indicator circuits for systems of that character.

In general, the invention provides a system for interpreting on a crossed coil meter signals derivable from a rotating loop and an omnidirectional antenna, and which may be operated without switching at the input of the receiver by virtue of the provision of suitable electronic switching and distributing circuits of novel character between the receiver output and the indicating meter.

In the present system, signals derived from the rotating loop and omnidirectional antenna are detected in a receiver, which may itself be of any suitable character, the output of the receiver being of sine wave character. Switching impulses are derived at 90° intervals of loop rotation, which are utilized to gate out, from every cycle of the sine wave four meter control pulses, each of which has a peak amplitude which is proportional to the instantaneous amplitude of the sine wave at the instant of switching. Means are provided for deriving direct currents proportional to the difference in amplitudes of alternate pulses, each of resultant pair of direct currents being applied to a coil of the crossed coil meter, for producing a magnetic field oriented in accordance with signal azimuth, and which may be translated by the meter.

It is, accordingly, an object of the invention to provide novel devices for indicating azimuthal direction of a signal.

It is another object of the invention to provide a system for producing directional indications by translation of pulse signals gated out or otherwise segregated from a total directional-information bearing signal.

A further object of the invention resides in the provision of devices for providing directional indications by means of novel switching circuits coupled to a directional receiver output, and particularly switching circuits which utilize selected portions of the receiver output.

It is another object of the invention to provide a system for comparing the phase of a rotating mechanical device with that of a sine wave signal by comparison of selected portions of the signal.

It is still a further object of the invention to provide novel apparatus for measuring the phase of a sine wave signal on a crossed coil meter by translation and comparison of selected relatively small portions of the signal.

The above and still further objects of the invention will become apparent upon study of the following detailed description of an embodiment of the invention, when taken in conjunction with the accompanying drawings, Fig. 1 of which is a schematic circuit diagram of an embodiment of our invention; and Fig. 2 of which is a curve used to explain the operation of the system.

In the drawings the numeral 1 denotes a loop antenna, which is continuously rotated by means of a motor 2, the mechanical drive between the loop and the motor being symbolically indicated by broken line 3. The signal output of the loop 1 is detected in a receiver, generally identified by the numeral 4, and which may be of any suitable and known character, but which is provided with an output circuit in the form of a diode 5 having a plate 6 and a cathode 7, the latter being connected to ground through a load resistor 8 by-passed by a condenser 9 for frequencies above that of the desired output signal. The loop 1 is associated in well known fashion with an omnidirectional antenna 10, whereby the output signal derivable across the resistance 8 will be of sine wave character, as the loop 1 rotates, the phase of the sine wave signal being dependent upon the azimuthal direction of the incoming radio signal from which the sine wave signal ultimately derives.

The signal appearing across the resistor 8 is coupled to an amplifier tube 11 by means of coupling condenser 12 and coupling resistance 13, the latter being connected at an adjustable point 14 to the control grid 15 of the tube 11. The tube 11 may be a pentode, comprising a suppressor grid 16 coupled directly to a cathode 17, and a screen grid 18, by-passed to ground over a condenser 19, and supplied with operating potential from a terminal 20 via a resistance 21. The amplifier tube 11 is cathode-biased by a resistance 22, and is supplied with potential for the plate 23 thereof from a terminal 24 over a plate load resistance 25.

The plate 23 of the tube 11 is coupled by means of a coupling condenser 26 to the control grid 27 of a cathode follower tetrode 28, having the usual suppressor grid 29 and screen grid 30, the later being supplied with operating potential from a terminal 31 over a resistance 32. The plate 33 of the tube 28 is supplied, likewise, with operating potential from a terminal 34 over a resistance 35, both plate and screen grid being by-passed to ground by condensers. A cathode follower arrangement is utilized because it is desired to have the sine wave added to a suitable D. C. level, so that the instantaneous voltage is always positive, at the same time that excessive unmodulated steady voltage is avoided. Correct bias for this purpose is applied to the grid 27 of the cathode follower 28 by means of a potentiometer arrangement comprising resistances 36 and 37 in series, the latter being adjustable, operating voltage for the potentiometer being tapped from the terminal 24.

The combined positive potential and sine wave variation appearing across the cathode resistance 38, connected in circuit with the cathode 39 of the tube 28, is impressed over lead 40 to the plates of switching tubes 41, 42, 43 and 44 in parallel, these triodes being normally biased to cut-off, and being switched on for short intervals only, as will appear hereinafter.

Connected in the cathode circuit of each of the tubes 41, 42, 43 and 44 are large time constant circuits 45, 46, 47, 48, each circuit comprising a parallel resistance-capacitance combination, the resistances 49, 50, 51, 52 each being greater than the internal resistance of its associated switching tube 41, 42, 43 and 44, respectively. By utilizing high relative values for resistances 49, 50, 51, 52 the potentials across these resistances may be maintained independent of the characteristics of tubes 41, 42, 43 and 44. The large time constants of the circuits 45–48, inclusive, serve to maintain steady voltage levels on the grids of D. C. amplifier tubes 53, 54, 55, 56 in response to pulsed signals applied to the grid circuits 45–48, inclusive.

Meter coil 57 is connected across the plates 58 and 59 of tubes 53 and 55, respectively, whereby the current flow in the coil 57 is a measure of the difference of voltage at the plates 58 and 59. Meter coil 60 is likewise connected across the plates 61 and 62 of tubes 54 and 56, respectively, a current flow being maintained in the coil 60 proportional to the difference of potential of plates 61 and 62. The tubes 53–56, inclusive, are maintained stable by providing therefor highly degenerative cathode circuits, each comprising one of resistances 63–66, respectively, and variable resistances 67, 68, 69 being provided in circuit with the resistances 64–66, inclusive, to enable balancing of the D. C. amplifiers.

The curve 70, Fig. 2, indicates generally the potentials appearing across the cathode resistance 38 and which is impressed upon each of the plates of the tubes 41–44, inclusive, and comprising a steady D. C. component 71 superimposed on the A. C. signal 70.

A series of pulses is applied in sequence to the tubes 41–44 of such magnitude and polarity as to cause these tubes to pass current momentarily. The points on curve 70 at which the pulses occur are equally spaced through the 360° duration of the curve, or are spaced at 90° intervals, at points 72, 73, 74 and 75. By applying to each of the control grids 76, 77, 78, 79 of tubes 41–44, inclusive, control pulses of sufficient magnitude, each of tubes 41–44, inclusive, is caused to pass a current pulse proportional to the value of potential represented by the points 72–75, and since the long time constant circuits 45–48 maintain potentials appearing thereacross the tubes 53–56, maintain corresponding steady D. C. current flows and therefore corresponding steady plate potentials, for application, in the manner heretofore explained, to the meter coils 57 and 60.

Pulses for application to the grids 76–79 are provided by a pulse generating circuit generally denominated by the numeral 80, and comprising a wheel 81 having a periphery of variable and constantly increasing radius, the radius being sharply steeped at one point 82 of the periphery. Wheel 81 is rotated continuously in synchronism with the rotary motion of the loop 1 by means of motor 2, the mechanical coupling between the motor 2 and the wheel 81 being indicated in conventional manner by broken line 83.

Located adjacent the periphery of the wheel 81, in space quadrature, is a series of magnet coils 84, 85, 86, 87, and the wheel 81 being constructed of magnetic material, passage of the point 82 of the wheel 81 past each of the coils 84–87, inclusive, results in the induction of a sharp voltage pulse therein by reason of the extremely sharp variation of magnetic flux which then takes place in the said coils.

The pulses produced in the coils 84–87 are time spaced, and occur at times corresponding with the times of the points 72–75, inclusive. The pulses are transferred via lines 88–91 to pulse amplifiers 92–95, respectively, the amplified pulses 96–99, inclusive, being then applied via transformer couplings 100–103, inclusive, to the grids 76–79 of the tubes 41–44. The use of transformer couplings to the grids 76–79 enables grid switching to be carried on independently of voltages appearing in the cathode circuits of the tubes.

Each of grids 76–79, inclusive, is provided with a D. C. restoring circuit consisting of a large condenser 104, and a large resistor 105. By virtue of the large R. C. time constant thus provided, the condensers 104 remain charged between pulses to the peak value of the applied pulses, maintaining a sufficiently large negative bias on the tubes 41–44, inclusive, to maintain these tubes at cutoff. While a pulse is being impressed the instantaneous grid to cathode voltages of tubes 41–44 become less negative, reducing to exactly zero at the peak of the pulse, at which times the tubes conduct.

It will be appreciated that great uniformity of tube characteristics and of circuit parameters in the switching channels is not required. The switching pulses provided in the various channels need not be all of the same amplitude, provided only that they are of sufficient amplitude to drive the switching tubes beyond the point at which grid current flows. No mechanical contact mechanism is required for switching. The system has been found to provide accurate indications of azimuth, and is inherently straightforward and capable of ready adjustment and control.

While we have described one embodiment of our invention, it will be realized that various modifications in the arrangements of the combination and in the details of its structure and the choice of its elements may be resorted to without violating the spirit of the invention as defined by the appended claims.

We claim:

1. In a direction finding receiver for radiant energy, the combination comprising a directive antenna system, means for effectively periodically rotating the directivity of said antenna system, a signal receiver for said antenna means including a detector for deriving a periodic signal wave from radiant energy received by said antenna having the periodicity of the rotation of the directivity of said antenna system, means for adding a direct current component to said signal wave, means for sampling said added direct current component and signal wave to derive a plurality of pulses for each period of said signal wave, an indicating meter having two field coils, said coils being coupled for combining given ones of said pulses for the purpose of amplitude comparison to indicate the direction of arrival of said radiant energy at said receiver.

2. In a direction finding receiver for radiant energy, the combination comprising a directive antenna system, means for effectively periodically rotating the directivity of said antenna system, a signal receiver for said antenna means including a detector for deriving a periodic signal wave from radiant energy received by said antenna having the periodicity of the rotation of the directivity of said antenna system, means for adding a direct current component to said signal wave, means for sampling said added direct current component and signal wave to derive a plurality of pulses for each period of said signal wave, said sampling means comprising means for providing gating pulses in synchronism with the rotary antenna, a plurality of switching tubes and means for applying said signal wave and said gating pulses to said switching tubes, and means for combining given ones of said pulses for the purpose of amplitude comparison to indicate the direction of arrival of said radiant energy at said receiver.

3. A direction finding system for transmitted radiant energy comprising a directive antenna system, means for cyclically varying the directivity of said antenna system, means responsive to the reception of energy by said antenna system and controlled by cyclically variable directivity to said antenna system for producing a cyclic signal wave, a source of gating pulses synchronized with said means for sampling said wave at spaced portions in its cycle, each of said pulses corresponding with a predetermined different directivity of said antenna system, normally blocked separate switching means corresponding to each of said predetermined directivity positions of the antenna system, an indicator coupled to said switching means for applying said signal wave to each of said switching means, means for applying each of said gating pulses to respective switching means for unblocking said switching means to permit application of said signal wave to said indicator for the duration of the gating pulses, said indicating means serving to compare the amplitudes of said sampled portions for determining the duration of the arrival of said energy at said antenna system.

4. In a direction finding receiver for radiant energy, the combination comprising a directive antenna, means for effectively rotating the directivity of said antenna at a given speed, a signal receiver for said antenna including a signal detector for deriving a sinusoidal signal wave from the energy received by said antenna the phase of which is dependent on the azimuthal position of said antenna, means for processing said sinusoidal wave to derive a corresponding uni-directional variable signal, a combining means for combining said sine wave and said uni-directional signal, means for providing a series of gating pulses for each cycle of said sine wave driven by said rotating means, signal translating circuit means for each of said cyclical gating pulses including an electronic switch for each circuit, means for applying said variable signal to said electronic switches in parallel, and means for combining the portions of said variable signal gated by alternate of said pulses for the purpose of comparison including the two coils of a direction indicating meter.

GEORGE L. PELLEGRINELLI.
MELVIN KLEIN.

REFERENCES CITED

The following references are of record in the file of this patent:

UNITED STATES PATENTS

| Number | Name | Date |
| --- | --- | --- |
| 2,263,377 | Busignies et al. | Nov. 18, 1941 |
| 2,272,607 | Higonnet | Feb. 10, 1942 |
| 2,380,929 | Ahier et al. | Aug 7, 1945 |
| 2,388,262 | Ganiayre et al. | Nov. 6, 1945 |
| 2,405,930 | Goldberg et al. | Aug. 13, 1946 |
| 2,415,566 | Rhea | Feb. 11, 1947 |
| 2,421,663 | Tolson | June 3, 1947 |